United States Patent [19]

Yoshida

[11] 4,424,875

[45] Jan. 10, 1984

[54] RUNNING CONTROL APPARATUS FOR TRACKLESS MOVING BODY

[75] Inventor: Yutaka Yoshida, Kudamatsu, Japan

[73] Assignee: Hitachi, Ltd., Tokyo, Japan

[21] Appl. No.: 247,718

[22] Filed: Mar. 26, 1981

[30] Foreign Application Priority Data

Mar. 31, 1980 [JP] Japan .................................. 55-40524

[51] Int. Cl.³ .............................................. B62D 1/28
[52] U.S. Cl. .................................... 180/168; 318/587; 364/424
[58] Field of Search ...................... 180/167, 168, 169; 318/587; 364/424, 434, 436

[56] References Cited

U.S. PATENT DOCUMENTS

| 3,045,221 | 7/1962 | Roop | 318/587 |
|---|---|---|---|
| 3,301,510 | 1/1967 | Cook | 244/191 |
| 3,653,456 | 4/1972 | Uemura | 180/168 |
| 4,109,186 | 8/1978 | Farque | 318/587 |

FOREIGN PATENT DOCUMENTS 53-46696 11/1978 Japan .
54-8530 4/1979 Japan .
690450 10/1979 U.S.S.R. .............................. 318/587

*Primary Examiner*—Joseph F. Peters, Jr.
*Assistant Examiner*—Kenneth R. Rice
*Attorney, Agent, or Firm*—Antonelli, Terry & Wands

[57] ABSTRACT

An apparatus for controlling the running of a trackless moving body. The apparatus includes a control device which comprises an adder receiving outputs from two position deviation sensors mounted on the moving body, a subtractor circuit receiving outputs from the two position deviation sensors, a first comparator receiving the output from the adder for comparing the same with a first reference value, a second comparator receiving the output from the subtractor for comparing the same with a second reference value, and a logic circuit receiving the comparison outputs from the first and second comparators for evaluating the direction of steering. Drive motors of the moving body are controlled by the control device to rotate substantially at the same speed at least when the logic circuit determines that the moving body is returning toward the correct direction.

6 Claims, 16 Drawing Figures

RUNNING CONTROL APPARATUS FOR TRACKLESS MOVING BODY

BACKGROUND OF THE INVENTION

1. Field of the Invention

This invention relates to an apparatus which controls a trackless moving body adapted to make running movement along a linear guide in the form of an electrically conductive wire or cable so that it can be accurately guided to run along the linear guide.

2. Description of the Prior Art

A transfer crane supported to run with rubber tires or wheels as shown in FIG. 1 is known as an example of a trackless moving body. This transfer crane is used as a cargo-handling machine which hoists and carries a load such as a container in a container yard or terminal.

The crane of this kind includes a trolley 2 capable of making traversing movement on a pair of girders 1, and a spreader 3 vertically movably suspended from the trolley 2 for releasably grasping a container 4. Rubber tires 5, 6, 7 and 8 are mounted on the lower ends of the four legs respectively of the transfer crane shown in FIG. 1. These rubber tires 5 to 8 are arranged at four relative positions as shown in FIG. 2. The rubber tire 5 is driven for rotation by a drive motor 9, and the rubber tire 8 is driven for rotation by another drive motor 10. The remaining rubber tires 6 and 7 are idlers which are merely rotatable relative to the transfer crane since there are no mechanical connections with such drive motors.

The transfer crane is arranged to run along a straight path when the two motors 9 and 10 are simultaneously driven at the same rotation speed. The running direction of the transfer crane can be changed so that it can run leftward or rightward from the straight path when one of the two motors 9 and 10 is deenergized or when the rotation speed of one of the two motors 9 and 10 is made higher or lower than that of the other. The transfer crane can thus be steered to run in any desired direction, and the two motors 9 and 10 serve the dual function of driving and steering the transfer crane.

The transfer crane is driven to run along the straight path under manual control of steering means which controls the operation of the motors 9 and 10. Practically, however, the difference between the diameters of the individual rubber tires 5, 6, 7, 8, the difference between the running resistances and loads imparted to the individual rubber tires 5, 6, 7, 8 and the unbalance of the operating characteristics of the individual motors 9 and 10 make it difficult to run the transfer crane along a straight path in spite of rotation of the two motors 9 and 10 at the same rotation speed, and the running direction of the transfer crane tends to deviate at an angle relative to the straight path. This tendency becomes more marked with the increase in the running speed of the transfer crane. In order to maintain the straightforward running of the transfer crane, a crane operator sitting in an operator's box 11 annexed to the trolley 2 has to effect the necessary steering control. However, the crane operator must also control the traversing movement of the trolley 2 and vertical movement of the spreader 3, and his burden is quite heavy in both the physical aspect and the mental aspect. A skilled crane operator is therefore required for the successful control of the crane operation.

However, it has become more and more difficult to obtain such a skilled operator in recent years, and it has been strongly demanded to furnish the crane of this kind with a function of automatic steering control so that the crane can be automatically guided to run along a straight path or track.

A control apparatus described below is known which is applicable to the crane of the kind above described so that the crane can be automatically controlled to run along a straight path or track.

According to the basic principle of the known control apparatus, a pair of sensors are mounted on the crane in a relation spaced apart from each other in the moving direction of the crane so as to sense the strength of a magnetic field produced by an electrically conductive wire or cable (a linear guide), which will be referred as a conductor cable, buried in the ground surface on which the crane runs, and the sensor output signals are processed in a steering control circuit which generates a steering control signal so that the crane can be guided to run along the conductor cable. The structure of such a steering control circuit is shown in FIG. 3. Referring to FIG. 3, the two sensors generate respective output signals 21 and 22 each indicative of the amount of position deviation from the track and having the polarity varying depending on the direction of position deviation. The signal 21 is applied to an adder 26 and to a differential amplifier 23, while the signal 22 is applied to the differential amplifier 23. In response to the application of the signals 21 and 22, the differential amplifier 23 makes arithmetic calculation to find the difference between the factors of position deviation indicated by the signals 21 and 22, and the difference is then divided by the distance between the two sensors, thereby generating an output signal 25 indicative of the angular deviation of the crane. This angular deviation signal 25 is applied to a differentiation 24 and to the adder 26. The signal 25 applied to the differentiator 24 is differentiated by the differentiator 24, and an output signal 27 indicative of the angular velocity is applied from the differentiator 24 to the adder 26. The adder 26 generates a steering control signal 28 on the basis of the input signals 21, 25 and 27 so that the crane can be guided to run straightforward along the conductor cable or guide wire.

Such a steering control circuit is, however, defective in that it tends to generate a spurious steering control signal 28 because the differentiator 24 itself tends to oscillate. The prior art control circuit is also defective in that the application of the plural signals 21, 25 and 27 to the same adder 26 makes complex and difficult the gain adjustment for the individual signals 21, 25 and 27, and the structure of the circuit becomes inevitably complex too.

SUMMARY OF THE INVENTION

It is therefore a primary object of the present invention to provide a control apparatus which can reliably attain, with a quite simple circuit construction, a desired accurate steering control of a trackless moving body.

In accordance with the present invention, there is provided an apparatus for controlling the running of a trackless moving body comprising: a conductor cable, a pair of position deviation sensors mounted on the trackless moving body in a relation spaced apart in the moving direction of the trackless moving body for sensing a deviation of the position of the trackless moving body relative to the conductor cable, and control means connecting the position deviation sensors to drive motors used for steering the trackless moving body, wherein the control means comprises adder means receiving the results of sensing from the position deviation sensors, subtractor means receiving the results of sensing from the position deviation sensors, first comparator means receiving the result of addition from the adder means for comparing the same with a first reference value, second comparator means receiving the result of subtraction from the subtractor means for comparing the same with a second reference value, evaluating means receiving the results of comparison from the first and second comparator means for evaluating the direction of steering, relay means receiving the result of evaluation from the evaluating means, and interlocking contacts of the relay means connected in field circuits of the motors respectively.

DESCRIPTION OF THE PREFERRED EMBODIMENTS

Figure 1:
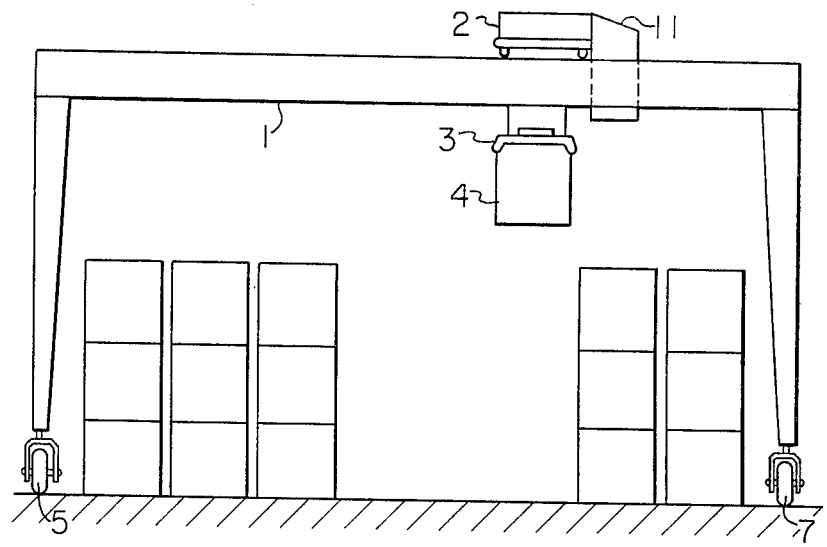
FIG. 1 is a schematic front elevation view of a transfer crane supported to run with rubber tires and used exclusively for handling containers.

Preferred embodiments of the running track control apparatus according to the present invention will now be described in detail with reference to its application to the transfer crane described already by reference to FIGS. 1 and 2.

Figure 2:
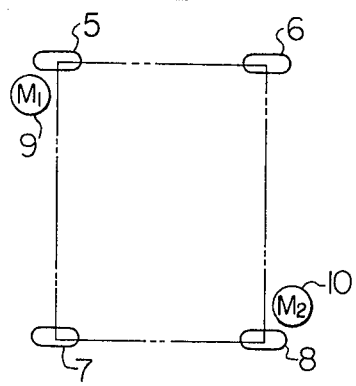
FIG. 2 is a schematic plan view showing the arrangement of the four rubber tires and two tire drive motors in the transfer crane shown in FIG. 1.
Figure 3:
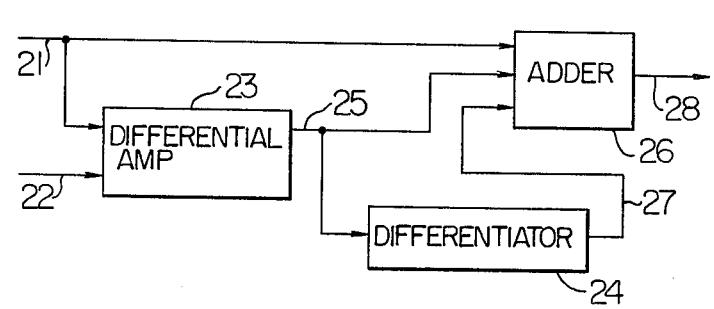
FIG. 3 is a block diagram of a steering control circuit already known in the art.
Figure 4:
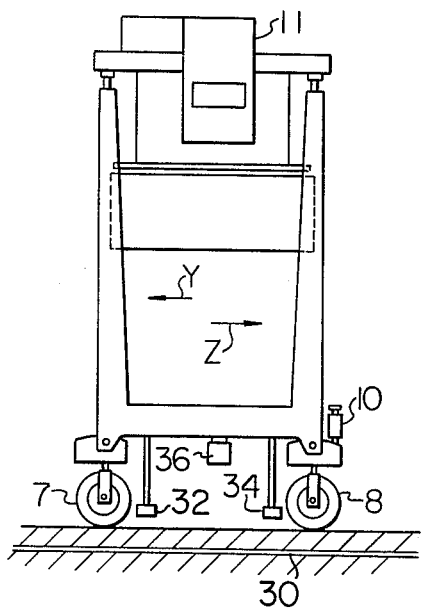
FIG. 4 is a schematic side elevation view of the transfer crane provided with an embodiment of the apparatus according to the present invention.

As shown in FIG. 2, the transfer crane can freely run by being supported on four rubber tires 5, 6, 7 and 8, and, among these rubber tires, the rubber tires 5 is driven by a drive motor 9, while the rubber tire 8 is driven by a drive motor 10. As usual, the remaining rubber tires 6 and 7 are idlers to each of which no drive force is imparted from such a drive motor.

A conductor cable 30 is previously buried in the ground surface on which the transfer crane is to run, and a current is supplied to this conductor cable 30 to produce a magnetic field therearound. A pair of spaced position deviation sensors 32 and 34 are mounted on the transfer crane to be located directly above the conductor cable 30 along which the transfer crane is guided. The position deviation sensor 32 is disposed in the forward direction, shown by the arrow Y, of the transfer crane, while the position deviation sensor 34 is disposed in the backward direction, shown by the arrow Z, of the transfer crane, and each of these sensors 32 and 34 senses the strength of the magnetic field established around the conductor cable 30 to convert it into a corresponding voltage signal indicative of the amount of position deviation relative to the conductor cable 30.

A block 36 containing various control means is mounted on the transfer crane at a position between the position deviation sensors 32 and 34. This block 36 includes a processing circuit as shown in FIG. 5 and a control logic circuit as shown in FIG. 8.

Figure 5:
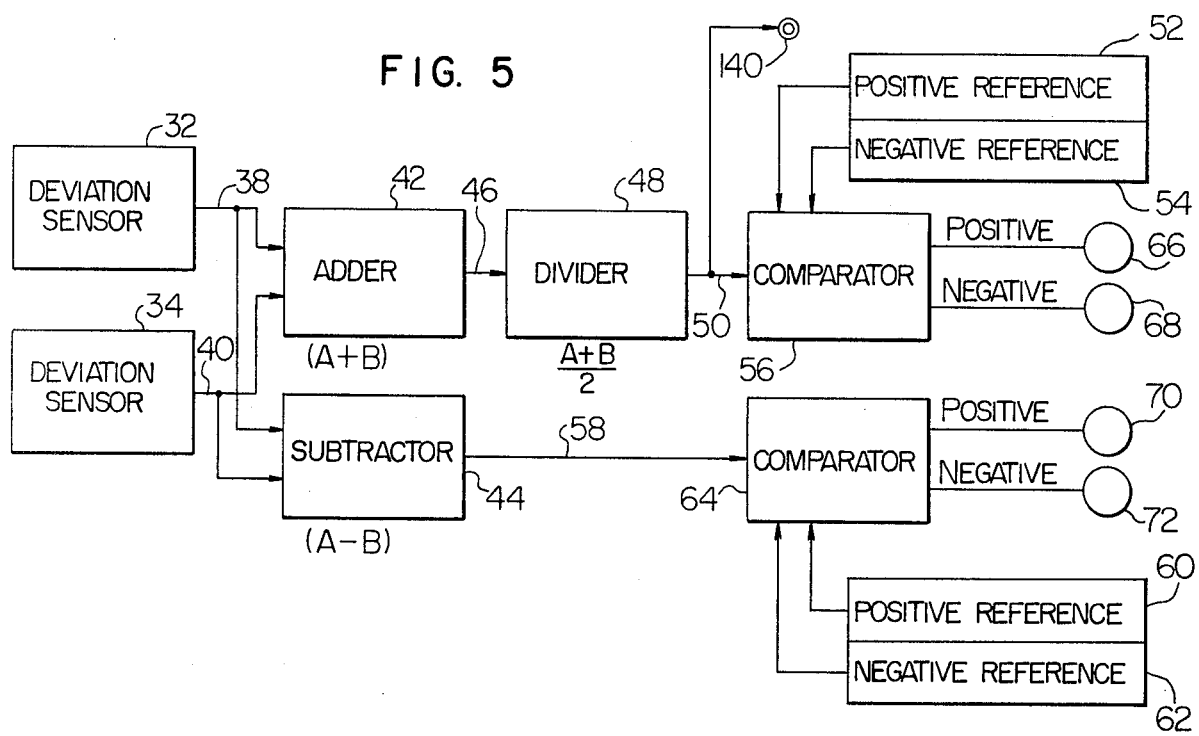
FIG. 5 is a block diagram of a sensor output signal processing circuit employed in the embodiment of the apparatus according to the present invention.

Referring to FIG. 5, the processing circuit includes an adder circuit 42 adding the output signal 38 of value A from the position deviation sensor 32 and the output signal 40 of value B from the position deviation sensor 34 to provide an output signal 46 indicative of the value (A+B), a subtractor circuit 44 subtracting the sensor output signal 40 of value B from the sensor output signal 38 of value A to provide an output signal 58 indicative of the value (A−B), a divider circuit 48 dividing the output signal 46 of value (A+B) from the adder circuit 42 by the factor of 2 to provide an output signal 50 indicative of the value (A+B/2), a first comparator circuit 56 comparing the output signal 50 of value (A+B/2) from the divider circuit 48 with a positive reference value 52 and a negative reference value 54, a second comparator circuit 64 comparing the output signal 58 of value (A−B) from the subtractor circuit 44 with a positive reference value 60 and a negative reference value 62, output relays 66 and 68 connected to the first comparator circuit 56, and output relays 70 and 72 connected to the second comparator circuit 64.

Figure 8:
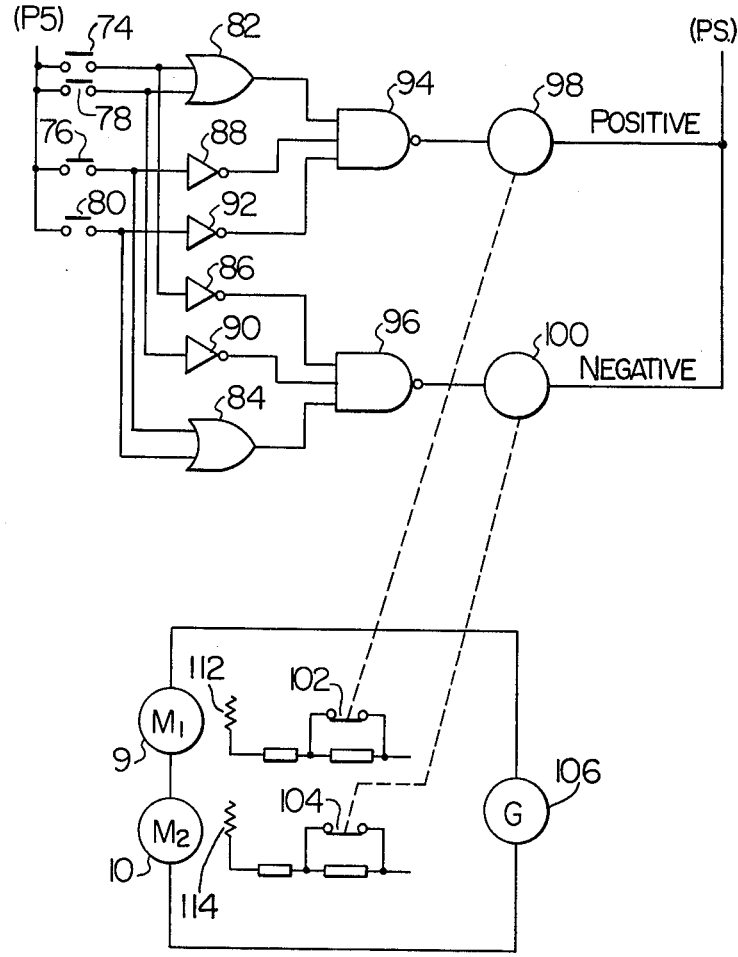
FIG. 8 is a circuit diagram of a control logic circuit for evaluating the result of processing by the signal processing circuit shown in FIG. 5 and applying a control signal to the drive motors in the embodiment of the apparatus according to the present invention.

Referring to FIG. 8, the control logic circuit includes a make contact 74 of the output relay 66, a make contact 76 of the output relay 68, a make contact 78 of the output relay 70, a make contact of the output relay 72, a first OR element 82 to which the signals passing through the relay contacts 74 and 78 are applied, a second OR element 84 to which the signals passing through the relay contacts 76 and 80 are applied, a first NOT element 86 to which the signal passing through the relay contact 74 is applied, a second NOT element 88 to which the signal passing through the relay contact 76 is applied, a third NOT element 90 to which the signal passing through the relay contact 78 is applied, a fourth NOT element 92 to which the signal passing through the relay contact 80 is applied, a first NAND element 94 to which the output signals from the first OR element 82, first NOT element 88 and fourth NOT element 92 are applied, a second NAND element 96 to which the output signals from the second OR element 84, first NOT element 86 and third NOT element 90 are applied, a first output relay 98 to which the output signal from the first NAND element 94 is applied, a second output relay 100 to which the output signal from the second NAND element 96 is applied, a break contact 102 of the output relay 98 connected in the field circuit 112 of the drive motor 9, and a break contact 104 of the output relay 100 connected in the field circuit 114 of the drive motor 10. As shown, the relays 98 and 100 are connected to a power source (P.S.)

The drive motors 9 and 10 are connected to a common generator 106 as shown in FIG. 8 to be driven by the power supplied from the generator 106. Any one of known rotation transmission means such as a chain drive and a shaft drive may be employed as desired to transmit the rotation force from the motors 9 and 10 to the respective rubber tires 5 and 8.

Figure 6:
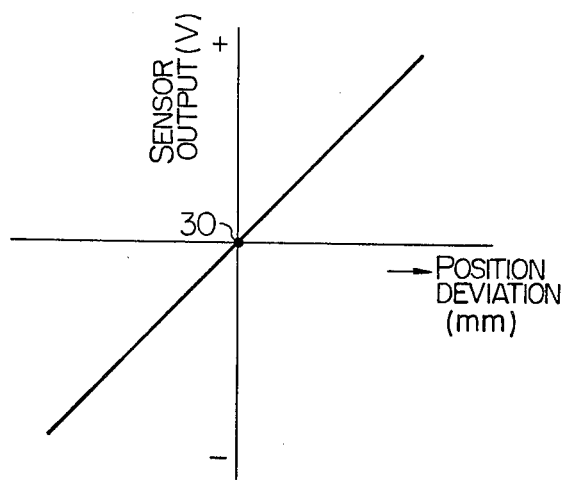
FIG. 6 shows the output characteristic of the position deviation sensors employed in the embodiment of the apparatus according to the present invention.

In operation, when the generator 106 is energized, the power generated from the generator 106 is supplied to the drive motors 9 and 10 so that the drive motors 9 and 10 start to simultaneously rotate. When thus the power generated from the single generator 106 is supplied to the two drive motors 9 and 10, the power is equally distributed to the drive motors 9 and 10 to cause rotation of these drive motors 9 and 10 at the same rotation speed, provided that there is no unbalance between the operating characteristics of the drive motors 9 and 10. Therefore, the transfer crane runs straightforward along the conductor cable 30. The position deviation sensors 32 and 34 are located directly above the conductor cable 30 when the direction of straightforward movement of the transfer crane coincides exactly with the extending direction of the conductor cable 30. In such a case, there is no deviation of the position deviation sensors 32 and 34 relative to the conductor cable 30. The position deviation sensors 32 and 34 have an output characteristic as shown in FIG. 6. It will be seen in FIG. 6 that, when the position of each of the position deviation sensors 32 and 34 deviates laterally in one direction from the origin which is herein the position of the conductor cable 30, the level of its output signal of positive polarity varies in proportion to the amount of lateral deviation, while when the position of each of the position deviation sensors 32 and 34 deviates laterally in the other direction from the origin, the level of its output signal of negative polarity varies in proportion to the amount of lateral deviation. Therefore, when the transfer crane runs straightforward along the conductor cable 30, the output signals from the position deviation sensors 32 and 34 are indicative of zero. In this case, the output signal 50 of the divider circuit 48 applied to the first comparator circuit 56 is indicative of ±0 which lies between the positive reference value 52 and the negative reference value 54. Similarly, the output signal 58 of the subtractor circuit 44 applied to the second comparator circuit 64 is also indicative of ±0 which lies between the positive reference value 60 and the negative reference value 62. Consequently, the output relays 66, 68, 70 and 72 are not energized and remain in their off states. Since all of these output relays 66, 68, 70 and 72 are in their off states, all of the relay contacts 74, 76, 78 and 80 in FIG. 8 remain in their open positions. Consequently, no signals are applied to the OR elements 82, 84 and to the NOT elements 86, 88, 90, 92. Therefore, an output signal of logic "0" appears from each of the OR elements 82 and 84, while an output signal of logic "1" appears from each of the NOT elements 86, 88, 90 and 92. The output signal of logic "0" from the first OR element 82 and the output signals of logic "1" from the second and fourth NOT elements 88 and 92 are applied to the first NAND element 94. Similarly, the output signal of logic "0" from the second OR element 84 and the output signals of logic "1" from the first and third NOT elements 86 and 90 are applied to the second NAND element 96. Consequently, output signals of logic "1" appear from the first and second NAND elements 94 and 96 to maintain the output relays 98 and 100 in their off states, hence, to maintain the relay contacts 102 and 104 in their closed positions. No field switchover control is effected to the drive motors 9 and 10, and both of the drive motors 9 and 10 rotate at the same rotation speed. Therefore, no signal for steering error correction purpose is applied to the transfer crane, and the transfer crane continues to run straightforward along the conductor cable 30. Thus, when the transfer crane is running with the position deviation sensors 32 and 34 located directly above the conductor cable 30, all of the output relays 66, 68, 70 and 72 are in their off states as shown in the ninth column of Table 1.

TABLE 1

| Relay No. | Col. No. | | | | | | | | |
|---|---|---|---|---|---|---|---|---|---|
| | 1st column | 2nd column | 3rd column | 4th column | 5th column | 6th column | 7th column | 8th column | 9th column |
| Relay 66 | ON | ON | ON | OFF | OFF | OFF | OFF | OFF | OFF |
| Relay 68 | OFF | OFF | OFF | OFF | ON | ON | ON | OFF | OFF |
| Relay 70 | OFF | ON | OFF | ON | OFF | OFF | ON | OFF | OFF |
| Relay 72 | OFF | OFF | ON | OFF | OFF | ON | OFF | ON | OFF |
| Correction | Positive | Positive | None | Positive | Negative | Negative | None | Negative | None |

In the condition in which all of the output relays 66, 68, 70 and 72 are in their off states, the transfer crane runs while tracing accurately the conductor cable 30 without the need for applying a steering error correcting signal thereto.

Figure 7A:
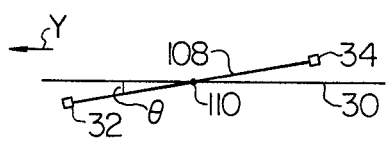
FIGS. 7A to 7H are schematic plan views showing various states of deviation of the position deviation sensors employed in the embodiment of the apparatus according to the present invention relative to the conductor cable buried in the ground surface.

The attitude of the running transfer crane may deviate from the track provided by the conductor cable 30 as, for example, shown in FIG. 7A in which it will be seen that the position deviation sensors 32 and 34 occupy such positions relative to the conductor cable 30 that the straight line 108 connecting between the position deviation sensors 32 and 34 makes an angle $\theta$ with respect to the conductor cable 30.

When now the transfer crane is running in the forward direction shown by the arrow Y, the attitude of the transfer crane deviates toward the left with respect to the forward direction shown by the arrow Y in the case of FIG. 7A. Thus, in the state shown in FIG. 7A, the output signal 38 from the position deviation sensor 32 is indicative of a value +A, and the output signal 40 from the position deviation sensor 34 is indicative of a value −B. The center 110 of the line 108 lies above the conductor cable 30 in FIG. 7A. Therefore, the absolute value of the amount of deviation of the position deviation sensor 32 from the conductor cable 30 is equal to that of the position deviation sensor 34 from the conductor cable 30, and hence, the absolute value of +A is equal to that of −B. Consequently, the output signal 46 from the adder circuit 42 is indicative of 0, and the output signal 50 from the divider circuit 48 is also indicative of 0. Therefore, the first comparator circuit 56 judges that the value 0, of the output signal 50 from the divider circuit 48 lies between the positive reference value 52 and the negative reference value 54. Consequently, the output relays 66 and 68 are not energized and remain in their off states. On the other hand, the output signal 58 from the subtractor circuit 44 is indicative of a large positive value which is larger than the positive reference value 60, and such an output signal 58 is applied to the second comparator circuit 64. As a result of comparison of the large positive value larger than the positive reference value 60 with the positive reference value 60 and the negative reference value 62 in the second comparator circuit 64, the output relay 70 is energized or placed in its on state, while the output relay 72 is not energized to remain in its off state. Consequently, the relay contact 78 is closed in FIG. 8, while the remaining relay contacts 74, 76 and 80 remain in their open or off positions. As a result of closure of the relay contact 78, an input signal of logic "1" is applied to one of the input terminals of the first OR element 82 connected to this relay contact 78, and such an input signal is also applied to the third NOT element 90 connected to the relay contact 78. On the other hand, input signals of logic "0" are applied to the other input terminal of the first OR element 82, to the two input terminals of the second OR element 84 and to the remaining NOT elements 86, 88 and 92. Consequently, an output signal of logic "0" appears from the first NAND element 94, while an output signal of logic "1" appears from the second NAND element 96. The output relay 98 is energized or placed in its on state, while the output relay 100 is not energized to remain in its off state. Consequently, the relay contact 102 is opened, while the relay contact 104 remains in its closed position. The rotation speed of the drive motor 9 is reduced due to the opening of the relay contact 102, while no change occurs in the rotation speed of the drive motor 10. Thus, the drive motors 9 and 10 rotate at different rotation speeds to correct the steering error, and the transfer crane makes approaching movement toward the conductor cable 30 until it accurately traces the track provided by the conductor cable 30. In such a situation, the output relay 70 only is in its on state, while the remaining output relays 66, 68 and 72 are in their off states as shown in the fourth column of Table 1, and the steering error is corrected in the positive direction by steering the transfer crane toward the right.

Figure 7B:
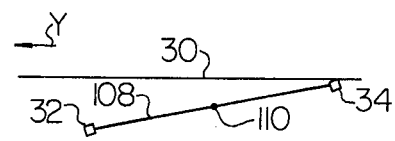

Suppose then that the transfer crane deviates from the conductor cable 30 as shown in FIG. 7B. In such a case, the output signal 38 from the position deviation sensor 32 is indicative of a large positive value, and the output signal 40 from the position deviation sensor 34 is indicative of a small positive value. Consequently, the output signal 46 from the adder circuit 42 is indicative of a very large positive value. Such an output signal 46 from the adder circuit 42 is divided by the factor of 2 in the divider circuit 48, and an output signal 50 indicative of the amount of deviation of the center 110 of the line 108 relative to the conductor cable 30 appears from the divider circuit 48. The value of this output signal 50 from the divider circuit 48 is equal to ½ of the value of the output signal 46 from the adder circuit 42 but is still larger than the positive reference value 52. As a result of comparision in the first comparator circuit 56, the output relay 66 is energized or placed in its on state, while the output relay 68 is not energized to remain in its off state. In the subtractor circuit 44, the value of the output signal 40 from the position deviation sensor 34 is subtracted from that of the output signal 38 from the position deviation sensor 32. Although the values of these sensor output signals 38 and 40 are both positive, the value of the output signal 38 is far larger than that of the output signal 40. Therefore, the output signal 58 from the subtractor circuit 44 is indicative of a value larger than the positive reference value 60. As a result of comparison in the second comparator circuit 64, the output relay 70 is energized or placed in its on state, while the output relay 72 is not energized to remain in its off state. In such a situation, the relay contacts 74 and 78 are closed in FIG. 8, while the relay contacts 76 and 80 remain in their open or off positions. Consequently, input signals of logic "1" are applied to the first OR element 82 and to the first and third NOT elements 86 and 90, while input signals of logic "0" are applied to the second OR element 84 and to the second and fourth NOT elements 88 and 92. Consequently, output signals of logic "1" appear from the first OR element 82 and from the second and fourth NOT elements 88 and 92, while output signals of logic "0" appear from the second OR element 84 and from the first and third NOT elements 86 and 90. Therefore, an output signal of logic "0" appears from the first NAND element 94 to energize the output relay 98, thereby opening the relay contact 102. On the other hand, an output signal of logic "1" appears from the second NAND element 96 to maintain the output relay 100 in its off state, thereby maintaining the relay contact 104 in its closed position. Therefore, the rotation speed of the drive motor 9 is reduced, while no change occurs in the rotation speed of the drive motor 10. Thus, the drive motors 9 and 10 rotate at different rotation speeds to correct the steering error in the positive direction, and the transfer crane is steered to run toward the right thereby approaching the conductor cable 30 until the transfer crane accurately traces the track provided by the conductor cable 30. Since, in this case, the output relays 66 and 70 are in their on state, while the output relays 68 and 72 are in their off states, as shown in the second column of Table 1, and the steering error is corrected in the positive direction by steering the transfer crane toward the right.

Figure 7C:
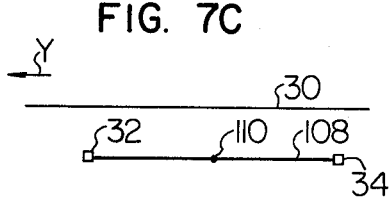

FIG. 7C shows that the transfer crane deviates greatly toward the left relative to the conductor cable 30 with the line 108 extending in parallel with the conductor cable 30. In such a case, the output signals 38 and 40 from the respective position deviation sensors 32 and 34 are indicative of the same positive value. Therefore, the output signal 46 from the adder circuit 42 is indicative of a positive value for larger than the positive reference value 52. Such an output signal 46 from the adder circuit 42 is divided by the factor of 2 in the divider circuit 48 to provide the output signal 50. The value of this output signal 50 from the divider circuit 48 is equal to ½ of that of the output signal 46 from the adder circuit 42 but is still larger than the positive reference value 52. The first comparator circuit 56 judges that the value of the output signal 50 from the divider circuit 48 is larger than the positive reference value 52, and as a result of comparison, the output relay 66 is energized or placed in its on state, while the output relay 68 is not energized to remain in its off state. On the other hand, the subtractor circuit 44, to which the sensor output signals 38 and 40 indicative of the same value and polarity are applied, generates its output signal 58 indicative of ±0 to apply such an output signal 58 to the second comparator circuit 64. The second comparator circuit 64 judges that the value of the output signal 58 from the subtractor circuit 44 lies between the positive reference value 60 and the negative reference value 62, and, as a result of comparison, the output relays 70 and 72 are not energized to remain in their off states. In such a situation, the relay contact 74 only is closed in FIG. 8, while the remaining relay contacts 76, 78 and 80 remain in their open or off positions. Consequently, input signals of logic "1" are applied to one of the input terminals of the first OR element 82 and to the first NOT element 86, while input signals of logic "0" are applied to the other input terminal of the first OR element 82, to the two input terminals of the second OR element 84 and to the remaining NOT elements 88, 90 and 92. Consequently, output signals of logic "1" appear from the first OR element 82 and from the second, third and fourth NOT elements 88, 90 and 92, while output signals of logic "0" appear from the second OR element 84 and from the first NOT element 86. Therefore, an output signal of logic "0" appears from the first NAND element 94 to energize the output relay 98. On the other hand, an output signal of logic "1" appears from the second NAND element 96 to maintain the output relay 100 in its off state. As a result, the relay contact 102 is opened, while the relay contact 104 remains in its closed position. Therefore, the rotation speed of the drive motor 9 is reduced, while no change occurs in the rotation speed of the drive motor 10. Thus, the drive motors 9 and 10 rotate at different rotation speeds to correct the steering error. The steering error is corrected in the positive direction by steering the transfer crane toward the right, and the transfer crane approaches the conductor cable 30 until it accurately traces the track provided by the conductor cable 30. Since, in this case, the output relay 66 only is in its on state, while the remaining output relays 68, 70 and 72 are in their off states, as shown in the first column of Table 1, the steering error is corrected in the positive direction by steering the transfer crane toward the right.

Figure 7D:
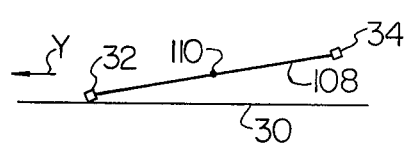

FIG. 7D shows that the transfer crane is running in the forward direction shown by the arrow Y, and the center 110 of the line 108 is returning toward or approaching the conductor cable 30. In such a case, there is no need for correcting the steering error. In this case, the output signal 38 from the position deviation sensor 32 is indicative of a negative value close to −0, while the output signal 40 from the position deviation sensor 34 is indicative of a large negative value. Therefore, the output signal 46 from the adder circuit 42 is also indicative of a large negative value. Such an output signal 46 from the adder circuit 42 is divided by the factor of 2 in the divider circuit 48 to provide the output signal 50 from the divider circuit 48. The value of this output signal 50 from the divider circuit 48 is equal to ½ of the output signal 46 from the adder circuit 42 but is larger in absolute value than the negative reference value 54. As a result of comparison in the first comparator circuit 56, the output relay 68 is energized or placed in its on state, while the output relay 66 is not energized to remain in its off state. In the subtractor circuit 44, the value of the output signal 40 from the position deviation sensor 34 is subtracted from that of the output signal 38 from the position deviation sensor 32. Since the values of these sensor output signals 38 and 40 are both negative, the output signal 58 from the subtractor circuit 44 is indicative of a positive value larger than the positive reference value 60. As a result of comparison in the second comparator circuit 64, the output relay 70 is energized or placed in its on state, while the output relay 72 is not energized to remain in its off state. In such a situation, the relay contacts 76 and 78 are closed in FIG. 8, while the relay contacts 74 and 80 remain in their open or off positions. Consequently, input signals of logic "1" are applied to one of the input terminals of the first OR element 82, to one of the input terminals of the second OR element 84 and to the second and third NOT elements 88 and 90, while input signals of logic "0" are applied to the other input terminal of the first OR element 82, to the other input terminal of the second OR element 84 and to the first and fourth NOT elements 86 and 92. Consequently, output signals of logic "1" appear from the first and second OR elements 82 and 84 and from the first and fourth NOT elements 86 and 92, while output signals of logic "0" appear from the second and third NOT elements 88 and 90. Therefore, output signals of logic "1" appear from both of the first and second NAND elements 94 and 96. As a result, both of the output relays 98 and 100 are not energized to remain in their off states thereby maintaining the relay contacts 102 and 104 in their closed positions. No difference occurs between the rotation speeds of the drive motors 9 and 10, that is, no steering error correction is carried out. The transfer crane continues to run in the forward direction with the center 110 of the line 108 gradually approaching the conductor cable 30. Since, in this case, the output relays 68 and 70 are in their on states, while the output relays 66 and 72 are in their off states, as shown in the seventh column of Table 1, no steering error correction is carried out.

Figure 7E:
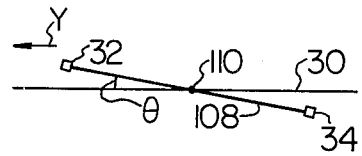

FIG. 7E shows that the attitude of the transfer crane deviates toward the right at an angle $\theta$ with respect to the conductor cable 30, with the center 110 of the line 108 lying above the conductor cable 30. In this case, the output signal 38 from the position deviation sensor 32 is indicative of a negative value, while the output signal 40 from the position deviation sensor 34 is indicative of a positive value, and the absolute value of the sensor output signal 38 is equal to that of the sensor output signal 40. Therefore, the output signal 46 from the adder circuit 42 is indicative of ±0, and the output signal 50 from the divider circuit 48 is also indicative of ±0. As a result of comparison in the first comparator circuit 56, the output relays 66 and 68 are not energized to remain in their off states. On the other hand, the output signal 58 from the substractor circuit 44 is indicative of a large negative value larger in absolute value than the negative reference value 62, and such an output signal 58 is applied to the second comparator circuit 64. As a result of comparison between the output signal 58 from the subtractor circuit 44 and the negative reference value 62 in the second comparator circuit 64, the output relay 72 is energized or placed in its on state, while the output relay 70 is not energized to remain in its off state. Consequently, the relay contact 80 only is closed in FIG. 8, while the remaining relay contacts 74, 76 and 78 remain in their open or off position. Consequently, input signals of logic "1" are applied to one of the input terminals of the second OR element 84 and to the fourth NOT element 92, while input signals of logic "0" are applied to the other input terminal of the second OR element 84, to the two input terminals of the first OR element 82 and to the remaining NOT elements 86, 88 and 90. Output signals of logic "0" appear from the first OR element 82 and from the fourth NOT element 92, while output signals of logic "1" appear from the second OR element 84 and from the remaining NOT elements 86, 88 and 90. Consequently, an output signal of logic "1" appears from the first NAND element 94, and an output signal of logic "0" appears from the second NAND element 96. The output relay 98 is not energized and remains in its off state, while the output relay 100 is energized or placed in its on state. Consequently, the relay contact 102 remains in its closed or on position, while the relay contact 104 is opened or placed in its off position. Therefore, the drive motors 9 and 10 rotate at different rotation speeds to correct the steering error in the negative direction, and the transfer crane is steered toward the left to approach the conductor cable 30 until the transfer crane accurately traces the track provided by the conductor cable 30. In such a situation, the output relay 72 only is in its on state, while the remaining output relays 66, 68 and 70 are in their off states, as shown in the eighth column of Table 1, and the steering error is corrected in the negative direction by steering the transfer crane toward the left.

Figure 7F:
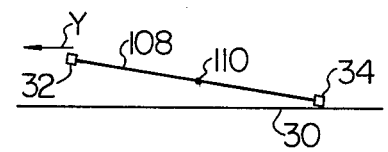

FIG. 7F shows that the position deviation sensors 32 and 34 mounted on the transfer crane deviate toward the right relative to the conductor cable 30. In such a case, the output signal 38 from the position deviation sensor 32 is indicative of a negative value, and the output signal 40 from the position deviation sensor 34 is also indicative of a negative value. The absolute value of the sensor output signal 40 is close to 0, while the absolute value of the sensor output signal 38 is very large compared with 0. Therefore, the output signal 46 from the adder circuit 42 is indicative of a very large negative value. Such an output signal 46 from the adder circuit 42 is divided by the factor of 2 in the divider circuit 48 to provide the output signal 50 from the divider circuit 48. The value of this divider output signal 50 is negative since the adder output signal 46 is of the negative polarity, and this value is still larger in absolute value than the negative reference value 54. As a result of comparison in the first comparator circuit 56, the output relay 68 is energized or placed in its on state, while the output relay 66 is not energized to remain in its off state. On the other hand, the output signal 58 from the subtractor circuit 44 is indicative of a negative value larger in absolute value than the negative reference value 62 since the sensor output signal 38 is indicative of the large negative value. Therefore, as a result of comparison in the second comparator circuit 64, the output relay 72 is energized or placed in its on state, while the output relay 70 is not energized to remain in its off state. In such a situation, the relay contacts 74 and 78 remain in their open positions in FIG. 8, while the relay contacts 76 and 80 are closed. Consequently, input signals of logic "0" are applied to the first OR element 82 and to the first and third NOT elements 86 and 90, while input signals of logic "1" are applied to the second OR element 84 and to the second and fourth NOT elements 88 and 92. Consequently, output signals of logic "0" appear from the first OR element 82 and from the second and fourth NOT elements 88 and 92, while output signals of logic "1" appear from the second OR element 84 and from the first and third NOT elements 86 and 90. Therefore, an output signal of logic "1" appears from the first NAND element 94, while an output signal of logic "0" appears from the second NAND element 96, with the result that the output relay 98 is not energized to remain in its off state, while the output relay 100 is energized or placed in its on state. The relay contact 102 remains in its closed position, while the relay contact 104 is opened. Thus, although the rotation speed of the drive motor 10 is reduced, its rotation speed differs from that of the drive motor 9 to correct the steering error in the negative direction, and the transfer crane is steered toward the left to approach the conductor cable 30 until the transfer crane accurately traces the track provided by the conductor cable 30. In such a situation, the output relays 68 and 72 are in their on states, while the output relays 66 and 70 are in their off states, as shown in the sixth column of Table 1, and the steering error is corrected in the negative direction by steering the transfer crane toward the left.

Figure 7G:
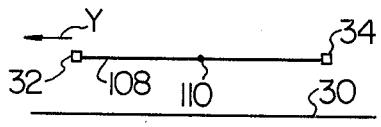

FIG. 7G shows that the transfer crane deviates greatly toward the left relative to the conductor cable 30 with the line 108 extending in parallel with the conductor cable 30. In such a case, the output signals 38 and 40 from the respective position deviation sensors 32 and 34 are indicative of the same negative value. Therefore, the output signal 46 from the adder circuit 42 is indicative of a very large negative value, and the output signal 50 from the divider circuit 48 which divides the adder output signal 46 by the factor of 2 is also indicative of a negative value larger in absolute value than the negative reference value 54. As a result of comparison in the first comparator circuit 56, the output relay 68 is energized or placed in its on state, while the output relay 66 is not energized to remain in its off state. On the other hand, the output signal 58 from the subtractor circuit 44 is indicative of ±0 which lies between the positive reference value 60 and the negative reference value 62, since both of the output signals 38 and 40 from the respective position deviation sensors 32 and 34 are negative and have the same absolute value. The output relays 70 and 72 are not energized and remain in their off states as a result of comparison in the second comparator circuit 64. In such a situation, the relay contact 76 only is closed in FIG. 8, while the remaining relay contacts 74, 78 and 80 are in their open or off positions. Consequently, input signals of logic "1" are applied to one of the input terminals of the second OR element 84 and to the second NOT element 88, while input signals of logic "0" are applied to the other input terminal of the second OR element 84, to the two input terminals of the first OR element 82 and to the remaining NOT elements 86, 90 and 92. Therefore, output signals of logic "0" appear from the first OR element 82 and from the second NOT element 88, while output signals of logic "1" appear from the second OR element 84 and from the remaining NOT elements 86, 90 and 92. Consequently, an output signal of logic "1" appears from the first NAND element 94, while an output signal of logic "0" appears from the second NAND element 96. The output relay 98 is not energized to remain in its off state, while the output relay 100 is energized or placed in its on state. Consequently, the relay contact 102 remains in its closed position, while the relay contact 104 is opened. The rotation speed of the drive motor 10 is reduced to provide a difference between it and the rotation speed of the drive motor 9 thereby correcting the steering error in the negative direction, and the transfer crane is steered toward the left to approach the conductor cable 30 until it accurately traces the track provided by the conductor cable 30.

Figure 7H:
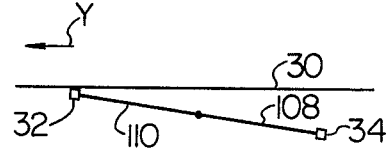

FIG. 7H shows that the center 110 of the line 108 connecting between the position deviation sensors 32 and 34 mounted on the transfer crane is returning rightward toward or approaching the conductor cable 30. In such a case, the output signal 38 from the position deviation sensor 32 is indicative of a positive value, and the output signal 40 from the position deviation sensor 34 is also indicative of a positive value. The absolute value of the sensor output signal 38 is close to 0, and the absolute value of the sensor output signal 40 is very large compared with 0. In this case, the output signal 46 from the adder circuit 42 is indicative of a very large positive value, and the output signal 50 from the divider circuit 48 which divides the adder output signal 46 by the factor of 2 is also indicative of a positive value larger than the positive reference value 52. As a result of comparison in the first comparator circuit 56, the relay 66 is energized or placed in its on state, while the output relay 68 is not energized to remain in its off state. On the other hand, the output signal 58 from the subtractor circuit 44 is indicative of a negative value larger in absolute value than the negative reference value, since the value of the sensor output signal 40 is larger than that of the sensor output signal 38. Therefore, as a result of comparison in the second comparator circuit 64, the output relay 70 is not energized and remains in its off state, while the output relay 72 is energized or placed in its on state. In such a situation, the relay contacts 74 and 80 are closed in FIG. 8, while the relay contacts 76 and 78 remain in their open positions. Therefore, input signals of logic "1" are applied to one of the input terminals of the first OR element 82, to one of the input terminals of the second OR element 84 and to the first and fourth NOT elements 86 and 92, while input signals of logic "0" are applied to the other input terminal of the first OR element 82, to the other input terminal of the second OR element 84 and to the second and third NOT elements 88 and 90. Consequently, output signals of logic "1" appear from the first and second OR elements 82, 84 and from the second and third NOT elements 88, 90, while output signals of logic "0" appear from the first and fourth NOT elements 86 and 92. Consequently, output signals of logic "1" appear from both of the first and second NAND elements 94 and 96. Therefore, both of the output relays 98 and 100 are not energized to remain in their off states, and both of the relay contacts 102 and 104 remain in their closed positions. No steering error correction is applied to the transfer crane, and the transfer crane continues to run in the forward direction with the center 100 of the line 108 gradually approaching the conductor cable 30. Since, in this case, the output relays 66 and 72 are in their on states, while the output relays 68 and 70 are in their off states, as shown in the third column of Table 1, no steering error correction is carried out.

It can be thus seen that the transfer crane can be steered under steering control to approach the conductor cable 30 when the transfer crane is tending to deviate from the conductor cable 30 at an angle θ or when the transfer crane has already deviated from the conductor cable 30. It can also be seen that, when the transfer crane is approaching the conductor cable 30, no steering control is applied to the transfer crane so that the angle of attitude of the transfer crane approaching the conductor cable 30 may not become excessively large. Therefore, the transfer crane can be steered to accurately trace the track provided by the conductor cable 30, and its angle of attitude relative to the conductor cable 30 during approaching movement can be made small enough to minimize the possibility of zigzag movement of the transfer crane.

Figure 9:
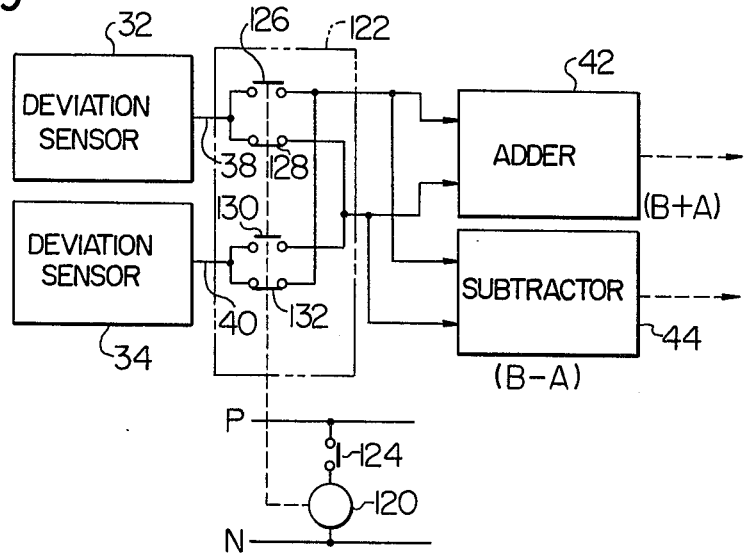
FIG. 9 shows another embodiment of the present invention in which an additional circuit is provided in the processing circuit shown in FIG. 5 so that the steering control can be effected in both the forward run and the backward run of the transfer crane.

The operation mode of the apparatus when the transfer crane runs in the backward direction shown by the arrow Z is generally similar to that when the transfer crane runs in the forward direction shown by the arrow Y. Therefore, by interchanging the mounting positions of the position deviation sensors 32 and 34, the transfer crane running in the backward direction, i.e. the direction Z, opposite to the direction Y can be similarly steered to approach the conductor cable 30, when it deviates from the predetermined position. However, interchanging of the mounting positions of the position deviation sensors 32 and 34 is not practical, and it is desirable to attain the purpose by additionally providing a sensor switching-over circuit. Such a circuit is preferably incorporated in the signal paths connecting the position deviation sensors 32, 34 to the adder circuit 42 and subtractor circuit 44 in FIG. 5. FIG. 9 shows such a circuit incorporated in the processing circuit shown in FIG. 5. Referring to FIG. 9, the sensor switching-over circuit includes a switch 122 having make contacts 126, 130 and break contacts 128, 132 connected between the position deviation sensors 32, 34 and the adder circuit 42 and subtractor circuit 44. This switch 122 is actuated by a relay 120 which is connected to an on-off switch 124. When now the switch 124 is turned on to energize the relay 120, the make contacts 126 and 130 are closed, while the break contacts 128 and 132 are opened, so that the transfer crane running in the forward direction shown by the arrow Y can be steered under steering control in the manner described hereinbefore. It will be seen that the connections in that condition are substantially the same as those in the processing circuit shown in FIG. 5. When, on the other hand, it is desired to apply steering control to the transfer crane running in the backward direction Z opposite to the forward direction shown by the arrow Y, the switch 124 is turned off to open the make contacts 126, 130 and to close the break contacts 128, 132. In that position of the switch 122, the adder circuit 42 functions to add the output signal 38 from the position deviation sensor 32 to the output signal 40 from the position deviation sensor 34 thereby generating its output signal 46 indicative of (B+A), and the subtractor circuit 44 functions to subtract the sensor output signal 38 from the sensor output signal 40 thereby generating its output signal 58 indicative of (B−A). Thus, the results are the same as those obtained when the mounting positions of the position deviation sensors 32 and 34 are shifted or exchanged. The switch 124 is preferably arranged for interlocking operation with the forward-backward drive controller installed in the operator's box 11.

In FIG. 5, the divider circuit 48 is shown connected between the adder circuit 42 and the first comparator circuit 56, and its function is to provide an output signal 50 indicative of the amount of position deviation of the center 110 of the line 108 relative to the conductor cable 30. However, the desired steering control can be attained without the provision of the divider circuit 48. When the divider circuit 48 is eliminated and the output signal 46 from the adder circuit 42 is applied directly to the first comparator circuit 56, the positive and negative reference values 52 and 54 must be two times as large as when the divider circuit 48 is provided.

The output signal 50 from the divider circuit 48 is indicative of the amount of position deviation of the center 110 of the line 108 relative to the conductor cable 30. The incorporation of the divider circuit 48 in the processing circuit in the apparatus is therefore advantageous in that the amount of position deviation of the center 110 of the line 108 relative to the conductor cable 30 can be visually confirmed when, for example, the output signal 50 from the divider circuit 48 is applied to a connection terminal 140 as shown in FIG. 5, and this connection terminal 140 is connected to an oscilloscope (not shown).

It will be understood from the foregoing detailed description of the present invention that the running control apparatus for a trackless moving body is quite simple in its circuitry in that the outputs from the individual position deviation sensors are merely applied to a signal processing circuit to be subject to addition and subtraction, and the results of the processing are merely compared with predetermined reference values. In addition, the apparatus can achieve the desired steering control of the trackless moving body without requiring a differentiation circuit which tends to oscillate. Therefore, the desired steering control can be reliable achieved by the apparatus in spite of its simple circuitry.

In the aforementioned embodiments of the present invention, addition, subtraction, division, comparison and evaluation of results are executed by independent circuits respectively. However, these circuits may be eliminated, and the output signals from the position deviation, sensors may be applied through analog-digital converters to a computer which carries out the steps of addition, subtraction, division, comparison and evaluation of results, so that necessary control signals may then be applied to the output relays as required.

I claim:

1. An apparatus for controlling the running of a trackless moving body comprising:

drive motors provided in a moving body for individually rotating at least one right-hand wheel and at least one left-hand wheel of said moving body;

a conductor cable disposed along a running path of said moving body for guiding said moving body, said cable producing a magnetic field;

at least two sensors spaced apart and disposed in said moving body in the running direction thereof, each of said sensors being responsive to the magnetic field of said cable for producing an output signal indicative of an amount of position deviation of said moving body relative to said conductor cable;

adder circuit means connected to said sensors for adding the output signals of said sensors to produce an output signal indicative of the addition result;

subtractor circuit means connected to said sensors for subtracting the output signals of said sensors to produce an output signal indicative of the subtraction result;

first comparator circuit means connected to said adder circuit means for comparing the output signal of said adder circuit means with a first reference range extending from a lower reference value to an upper reference value and for producing an output signal indicative of the comparison result;

second comparator circuit means connected to said subtractor circuit means for comparing the output signal of said subtractor circuit means with a second reference range extending from a lower reference value to an upper reference value and for producing an output signal indicative of the comparison result;

logic circuit means connected to said first and second comparator circuit means and responsive to the output signals thereof for determining the attitude of said moving body with respect to said conductor cable, said logic circuit means producing output signals indicative of the determined attitude;

output relay means connected to said logic circuit means and said drive motors, said output relay means being responsive to the output signals of said logic circuit means for selectively controlling said drive motors by varying the rotational speeds of said drive motors;

wherein said logic circuit means produces output signals for said output relay means to control said drive motors to rotate substantially at the same rotational speed at least when said logic circuit means determines from the output signals of said comparator circuit means that said moving body is closer to said conductor cable than a predetermined distance and is approaching said conductor cable; and wherein said logic circuit means produces output signals for said output relay means to control said drive motors to rotate at different rotational speeds so as to steer said moving body toward said conductor cable when said logic circuit means determines from the output signals of said comparator circuit means that said moving body is separated from said conductor cable and is running substantially along the elongated direction of said conductor cable or that said moving body is deviating away from said conductor cable.

2. An apparatus according to claim 1, wherein the number of said sensors is two, and said apparatus further comprises first switch means disposed between an output of one of said sensors and a respective first input of said adder circuit means and said subtraction circuit means; second switch means disposed between the output of said one of said sensors and a respective second input of said adder circuit means and said subtractor circuit means; third switch means disposed between an output of the other of said sensors and said respective second input of said adder circuit means and said subtractor circuit means; and fourth switch means disposed between the output of said other of said sensors and said respective first input of said adder circuit means and said subtractor circuit means, said first, second, third and fourth switch means being selectively switched in accordance with forward and backward running directions of said moving body.

3. An apparatus according to claim 1, further comprising a divider circuit means connected between said adder circuit means and said first comparator circuit means for dividing the result of addition by the factor of 2, and an externally available connection terminal provided at an output of said divider circuit means for extracting the result of division from said divider circuit means.

4. An apparatus according to claim 1, wherein said first comparator circuit means provides an output signal indicative of whether the output signal of said adder circuit means is below, within or greater than the first reference range and said second comparator circuit means provides an output signal indicative of whether the output signal of said subtractor circuit means is below, within or greater than the second reference range.

5. An apparatus for controlling the running of a trackless moving body comprising:

a moving body having drive motors for individually rotating at least one right-hand wheel and at least one left-hand wheel of said moving body;

a conductor cable disposed along a running path of said moving body for guiding said moving body, said cable producing a magnetic field;

at least two sensors spaced apart and disposed in said moving body in the running direction thereof, each of said sensors being responsive to the magnetic field of said cable for producing an output signal indicative of an amount of position deviation of said moving body relative to said conductor cable;

adder circuit means connected to said sensors for adding the output signals of said sensors and for producing an output signal indicative of the addition result;

subtractor circuit means connected to said sensors for subtracting the output signals of said sensors and for producing an output signal indicative of the subtraction result;

first comparator circuit means connected to said adder circuit means for comparing the output signal of said adder circuit means with a first reference range extending from a lower reference value to an upper reference value and for producing an output signal indicative of the comparison result;

second comparator circuit means connected to said subtractor circuit means for comparing the output signal of said subtractor circuit means with a second reference range extending from a lower reference value to an upper reference value and for producing an output signal indicative of the comparison result;

logic circuit means connected to said first and second comparator circuit means and responsive to the output signals thereof for determining the attitude of said moving body with respect to said conductor cable, said logic circuit means producing output signals indicative of the determined attitude; and at least two output relay means connected to said logic circuit means and said drive motors, said output relay means being responsive to the output signals of said logic circuit means for selectively controlling said motors by varying the rotational speeds of said drive motors;

wherein said logic circuit means provides output signals rendering all of said output relay means to be in the same actuation condition so as to control said motors to rotate substantially at the same rotational speed when (a) said first comparator circuit means produces an output signal indicating that the output signal of said adder circuit means falls within said first referenece range while said second comparator circuit means produces an output signal indicating that the output signal of said subtractor circuit means falls within said second reference range, (b) said first comparator circuit means produces an output signal indicating that the output of said adder circuit means is below the lower value of said first reference range while said second comparator circuit means produces an output signal indicating that the output signal of said subtractor circuit means exceeds the upper value of said second reference range, and (c) said first comparator circuit means produces an output signal indicating that the output signal of said adder circuit means exceeds the upper value of said first reference range, while said second comparator circuit means produces an output signal indicating that the output signal of said subtractor circuit means is below the lower value of said second reference range;

wherein said logic circuit means renders one of said output relay means to be energized and another of said output relay means to be deenergized when (a) said first comparator circuit means produces an output signal indicating that the output signal of said adder circuit means exceeds the upper value of said first reference range, and (b) said second comparator circuit means produces an output signal indicating that the output signal of said subtractor circuit means exceeds the upper value of said second reference range, and wherein said logic circuit means renders the one of said output relay means to be deenergized and the another of said output relay means to be energized when (a) said first comparator circuit means produces an output signal indicating that the output signal of said adder circuit means is below the lower value of said first reference range, and (b) said second comparator circuit means produces an output signal indicating that the output signal of said subtractor circuit means is below the lower value of said second reference range.

6. An apparatus according to claim 5, wherein two output relay means are provided, the one of said output relay means being associated with a drive motor for a right-hand wheel and the another of said output relay means being associated with a drive motor for a left-hand wheel.

* * * * *